June 30, 1942. M. C. RICHARDSON 2,288,028
FURNACE
Filed Nov. 7, 1939 5 Sheets-Sheet 1
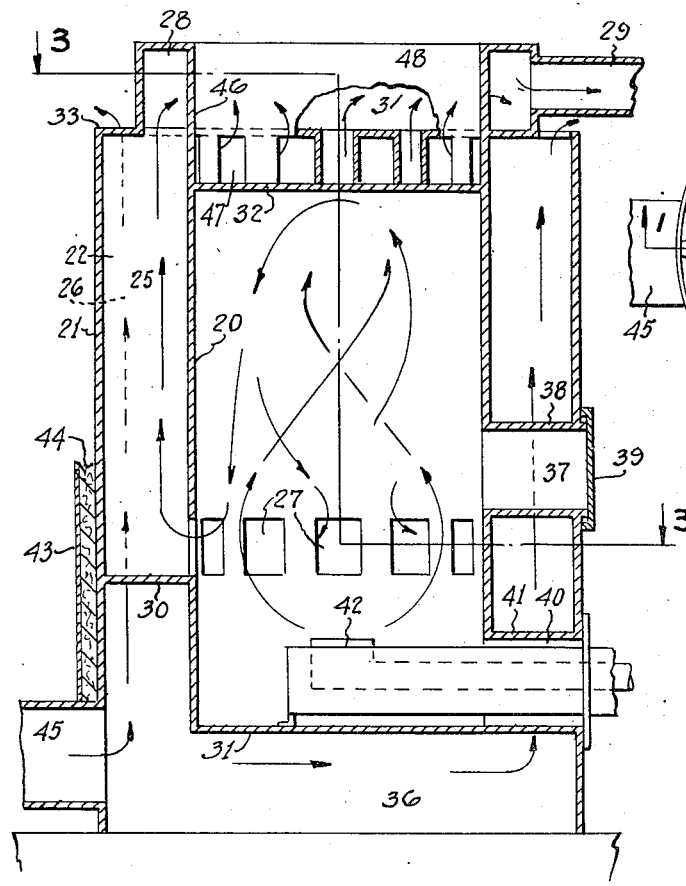
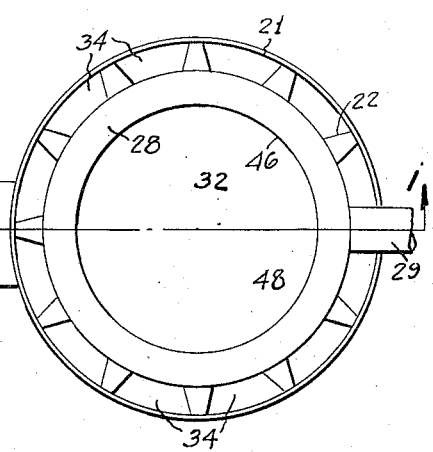
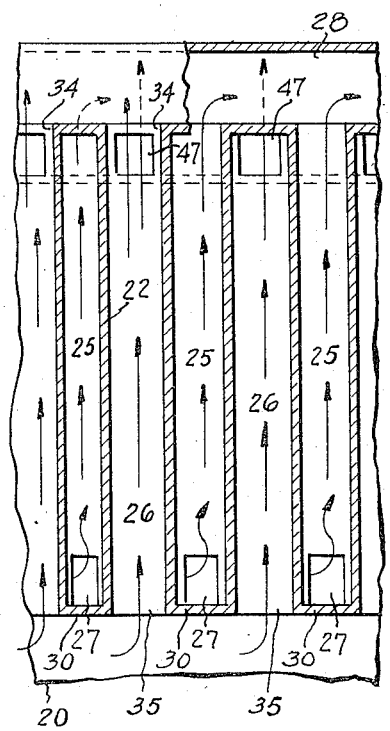
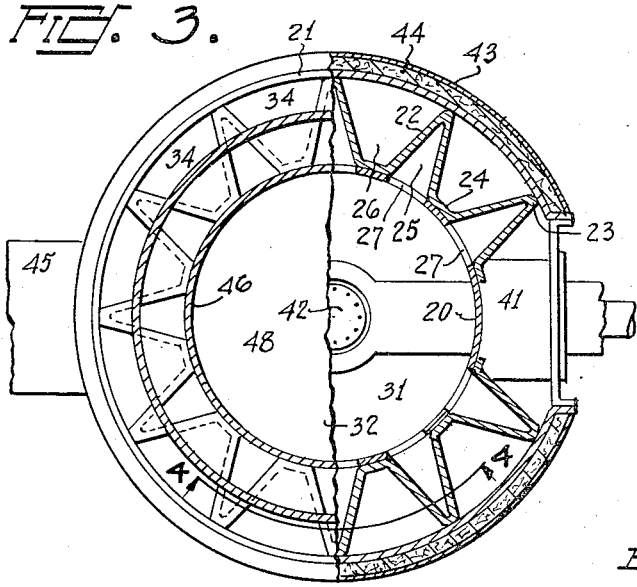
INVENTOR
MAX C. RICHARDSON
BY
ATTORNEY June 30, 1942.   M. C. RICHARDSON   2,288,028
FURNACE
Filed Nov. 7, 1939   5 Sheets-Sheet 2
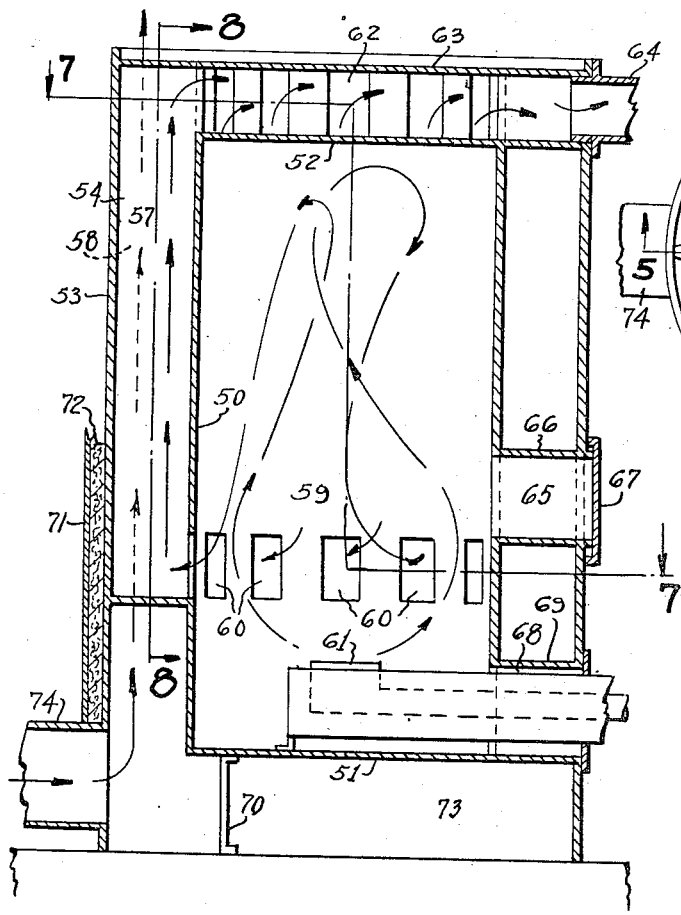
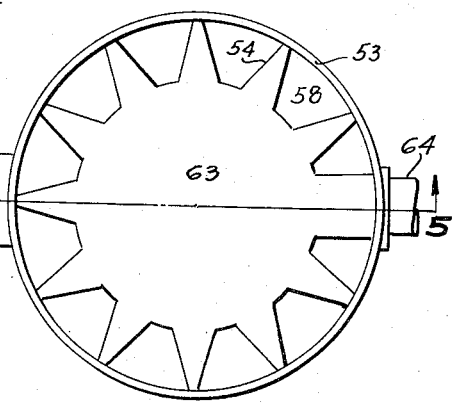
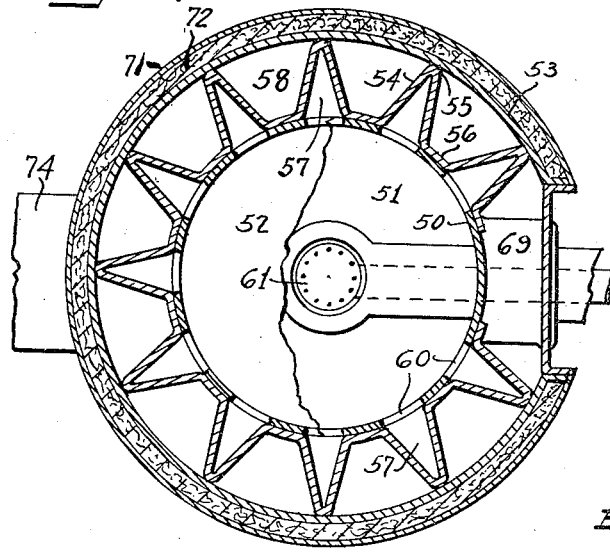
INVENTOR
MAX C. RICHARDSON
BY
ATTORNEY June 30, 1942. M. C. RICHARDSON 2,288,028
FURNACE
Filed Nov. 7, 1939 5 Sheets-Sheet 3

INVENTOR
MAX C. RICHARDSON
BY
ATTORNEY

June 30, 1942. M. C. RICHARDSON 2,288,028
FURNACE
Filed Nov. 7, 1939 5 Sheets-Sheet 4
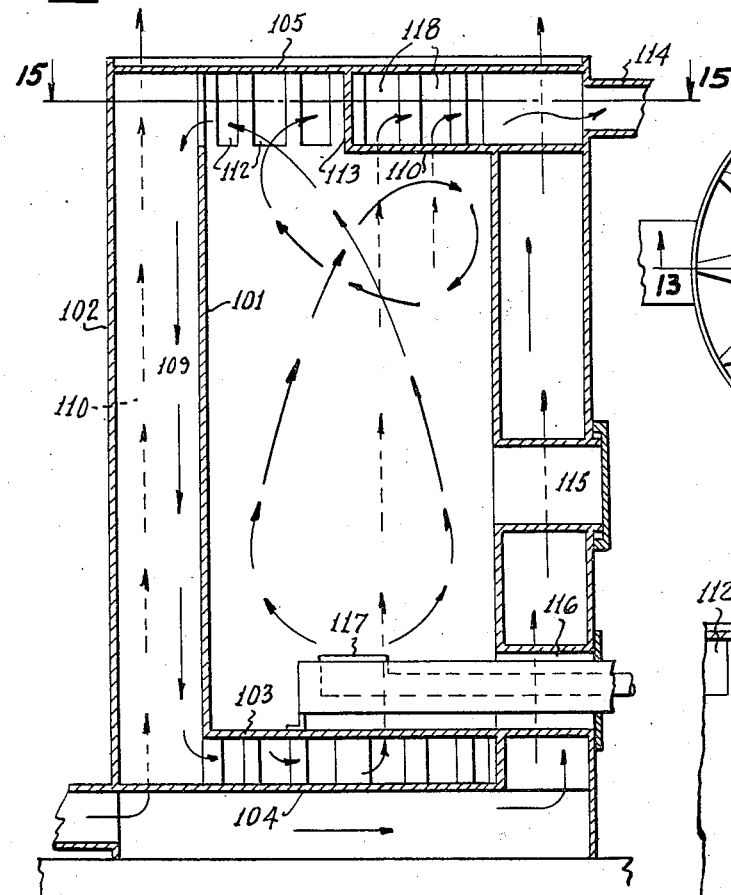
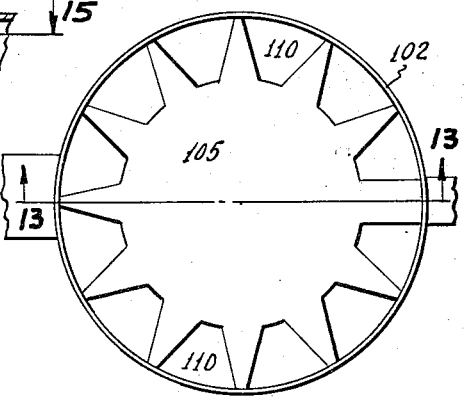
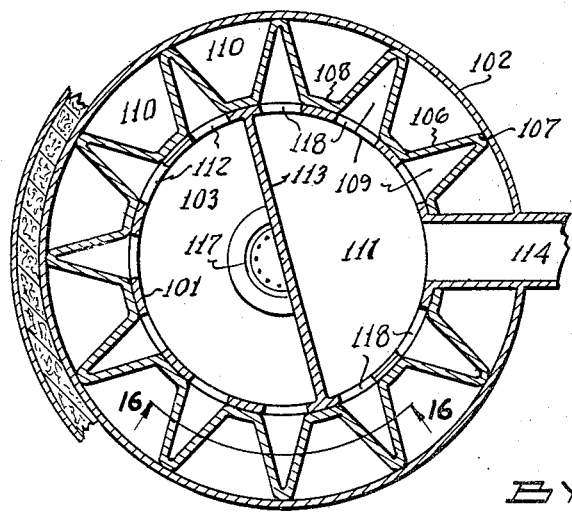
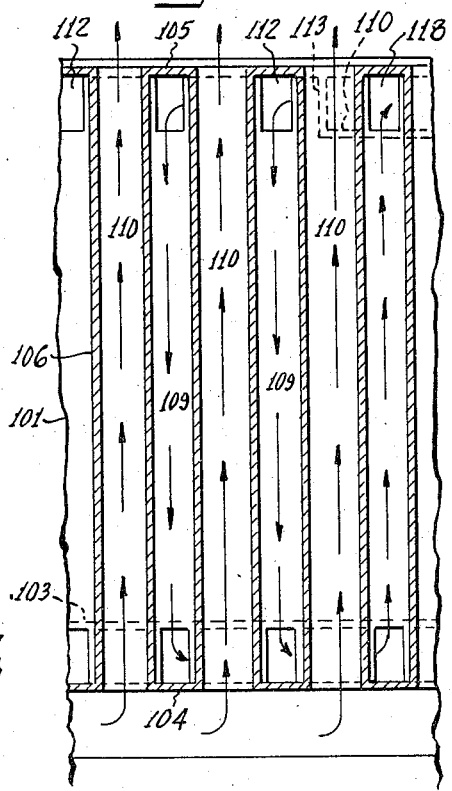
INVENTOR
MAX C. RICHARDSON
BY
ATTORNEY June 30, 1942.    M. C. RICHARDSON    2,288,028
FURNACE
Filed Nov. 7, 1939    5 Sheets-Sheet 5
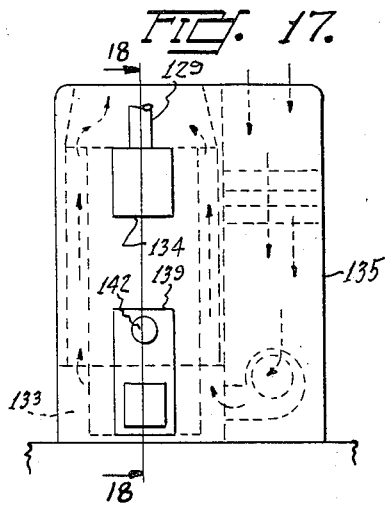
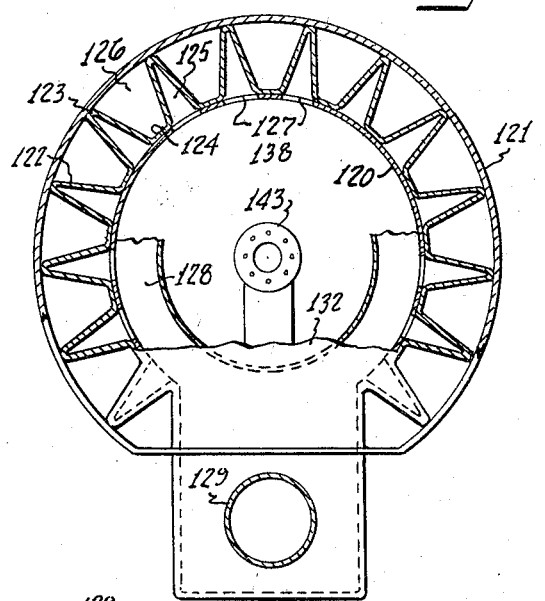
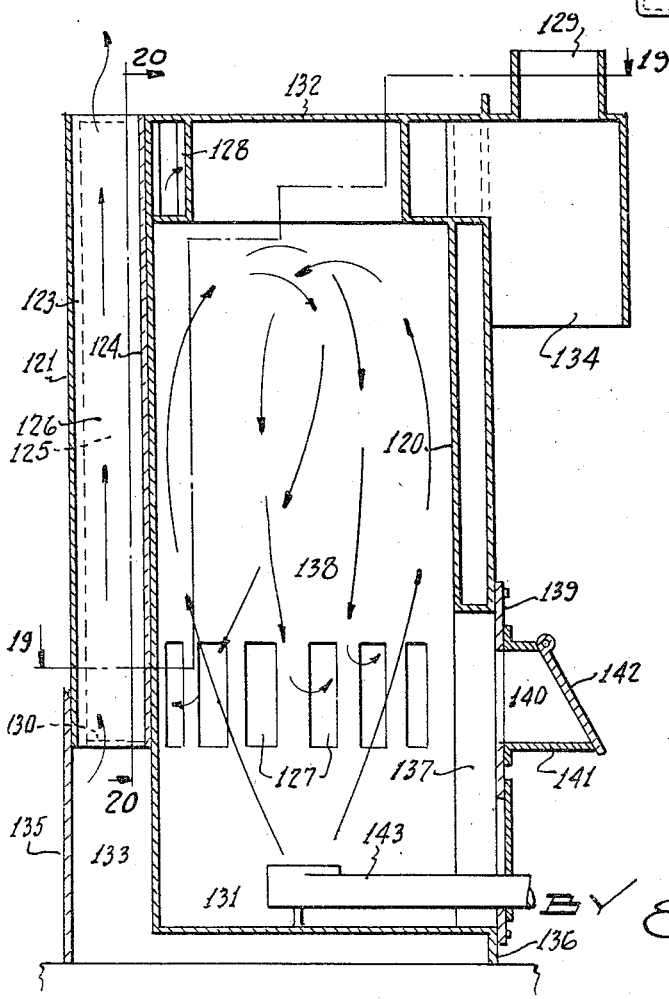
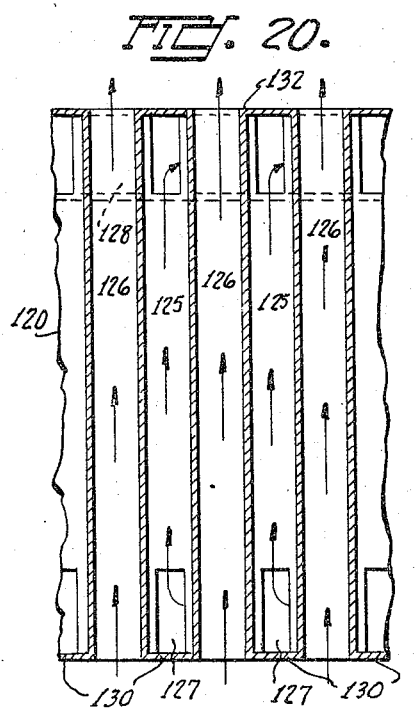
INVENTOR
MAX C. RICHARDSON
ATTORNEY Patented June 30, 1942

2,288,028

UNITED STATES PATENT OFFICE 2,288,028

FURNACE

Max C. Richardson, Portland, Oreg., assignor to Iron Fireman Manufacturing Company, Portland, Oreg.

Application November 7, 1939, Serial No. 303,233

4 Claims. (Cl. 126—99)

This invention relates generally to heat transfer devices, and particularly to a furnace.

The main object of this invention is to construct a furnace which will not be self-condensing in order to keep the liquid products of combustion from attacking the structure of the furnace.

The second object is to construct a furnace of the class described which will be devoid of "hot" and "cold" spots and in which the heat is conducted away as fast as it is absorbed from the walls of the gas confining chambers and passageways.

The third object is to construct a furnace of the class described in a manner that the gases passing through the passageways thoroughly scour the walls thereof in order that the desired amount of heat may be extracted therefrom before the gases escape into the stack.

The fourth object is to construct a furnace which will be self cleaning and in which the few places wherein fly ash can accumulate are constantly swept by strong currents of combustion gases and are either carried out through the stack or fall back into the combustion chamber of the furnace.

These and other objects are accomplished in the manner set forth in the following specification as illustrated in the accompanying drawings, in which:

Fig. 1 is a vertical section through one form of the device taken along the line 1—1 in Fig. 2.

Fig. 2 is a plan of the device.

Fig. 3 is a broken section taken along the line 3—3 in Fig. 1.

Fig. 4 is a fragmentary section taken along the line 4—4 in Fig. 3.

Fig. 5 is a vertical section through a second form of the device.

Fig. 6 is a plan of Fig. 5.

Fig. 7 is a broken horizontal section taken along the line 7—7 in Fig. 5.

Fig. 8 is a fragmentary vertical section taken along the line 8—8 in Fig. 5.

Fig. 13 is a vertical section through a fourth form of the device.

Fig. 14 is a plan of Fig. 13.

Fig. 15 is a horizontal section taken along the line 15—15 in Fig. 13.

Fig. 16 is a fragmentary section taken along the line 16—16 in Fig. 15.

Fig. 17 is a front elevation of the preferred form of the device.

Fig. 18 is a vertical section taken along the line 18—18 in Fig. 17.

Fig. 19 is a broken section taken along the line 19—19 in Fig. 18.

Fig. 20 is a fragmentary section taken along the line 20—20 in Fig. 18.

Similar numerals refer to similar parts throughout the several views.

Figure 9:
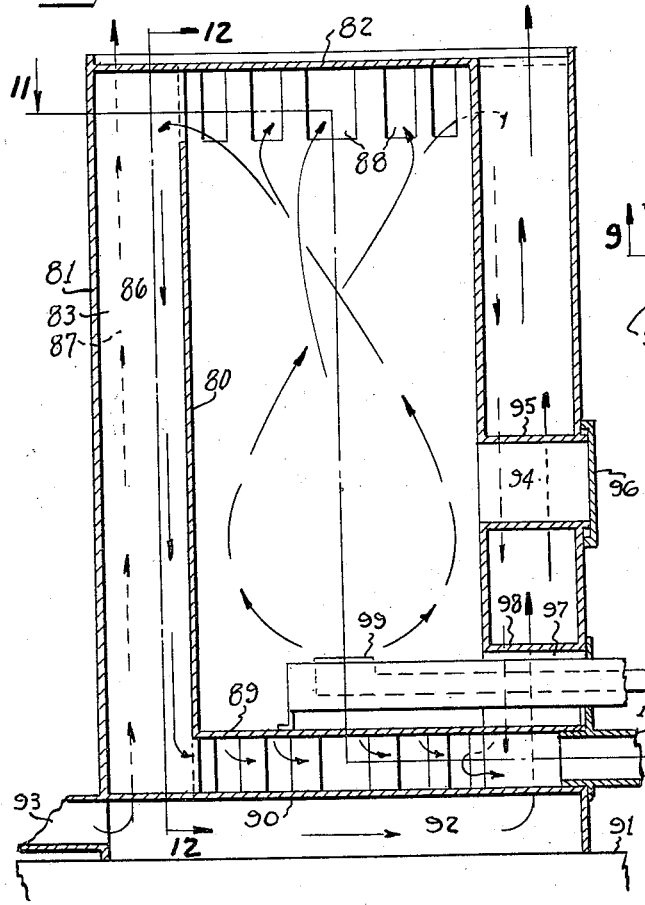
Fig. 9 is a vertical section through the third form of the device taken along the line 9—9 in Fig. 10.

Referring in detail to Figs. 1 to 4, inclusive, there is shown a cylindrical fire box 20 which is disposed within the cylindrical shell 21 which is spaced therefrom by a saw-toothed spacer 22 whose outermost points 23 engage the shell 21 and whose innermost edges 24 engage the outer surface of the fire box 20.

This construction divides the space between the fire box 20 and the shell 21 into gas flues 25 and air flues 26. Ports 27 in the lower portion of the fire box 20 communicate with the flues 25 which terminate in the circular manifold 28 formed around the top of the furnace from which the burned gases pass through the smoke-pipe 29 to a stack (not shown).

The lower end of each flue 25 is closed by a bottom end plate 30. Across the lower end of the fire box 20 is placed a floor plate 31. A crown plate 32 is placed across the top of the fire box 20 a short distance below the top 33 of the shell 21. Openings 34 are formed in the top edge 33 and openings 35 are formed between the bottom end plates 30 in order to permit the free upward passage of warm air from the space 36 through the flues 26 and out of the openings 34 into the warm air ducts of the heating system.

A fire door opening 37 is formed by extending the shell 38 through the members 20 and 21. A closure 39 is provided for the shell 38. This is normally closed except for inspection purposes. Below the fire door opening 37 is disposed a burner opening 40 which is formed by extending the shell 41 through the members 20 and 21.

A burner 42 of any desired type may be inserted through the opening 40 into the fire box 20. It is desirable to provide the casing 43 around the furnace, said casing being spaced from the shell 21 and the space being filled by means of a suitable insulating material, such as asbestos, cork or other material 44. The cold air inlet pipe 45 communicates through the side of the shell 21 with the space 36.

In the cylindrical wall 46 which forms an extension of the fire box 20 are formed the warm air outlet openings 47 through which air can pass into the pocket 48 and in so doing passes over the crown plate 32 and prevents the overheating thereof.

It can thus be seen that there is a complete circulation of air about the portions of the furnace which are exposed to the heat generated therein and that the air is held in close contact with the metal thereby enabling it to better absorb the heat therefrom.

Referring in detail to the form of the device shown in Figs. 5 to 8, inclusive, there is shown a fire box 50 which is cylindrical in form and has a flat bottom 51 and a flat top 52. The fire box 50 is placed within the cylindrical shell 53 and spaced therefrom by means of the saw-toothed spacer 54 whose outermost points 55 contact the shell 53 and whose innermost edges 56 engage the fire box 50 forming the V-shaped gas channels 57 and the larger V-shaped air channels 58. The channels 57 communicate at their lower ends with the combustion space 59 through the ports 60 through which gases burned by the burner 61 pass upwardly through the channels 57 into the space 62 between the top 52 and the cap 63 of the shell 53 from whence the gases escape through the smoke pipe 64 to the stack not shown.

A fire inspection opening 65 is formed by passing the shell 66 through the members 50 and 53. The opening 65 is ordinarily closed by means of the door 67. A burner inlet opening 68 is formed by passing the shell 69 through the members 50 and 53 through which opening 68 the burner 61 may be extended into the fire box 50.

It is desirable to provide a support 70 on the underside of the bottom 51. It is also desirable to provide an outer casing 71 which is spaced from the shell 53 and to fill the space with insulating material 72. Cold air is admitted to the space 73 under the bottom 51 through a cold air inlet 74.

In this form of the device the gases are burned within the combustion space 59 and much of the heat therefrom is given up to the bottom 51, the top 52 and the side walls of the fire box 50. The gas is then passed through the port 60 upwardly through the channels 57 where more of their heat is given up to the spacer 54 and from thence carried away by the air in the channels 58 and the air circulating over the cap 63.

Figure 10:
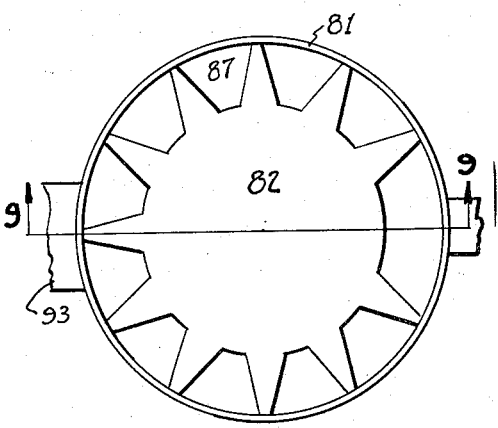
Fig. 10 is a plan of Fig. 9.
Figure 12:
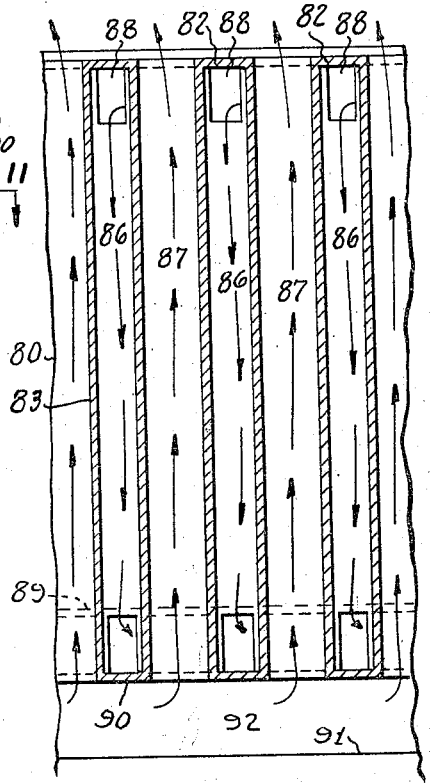
Fig. 12 is a fragmentary section taken along the line 12—12 in Fig. 9.
Figure 11:
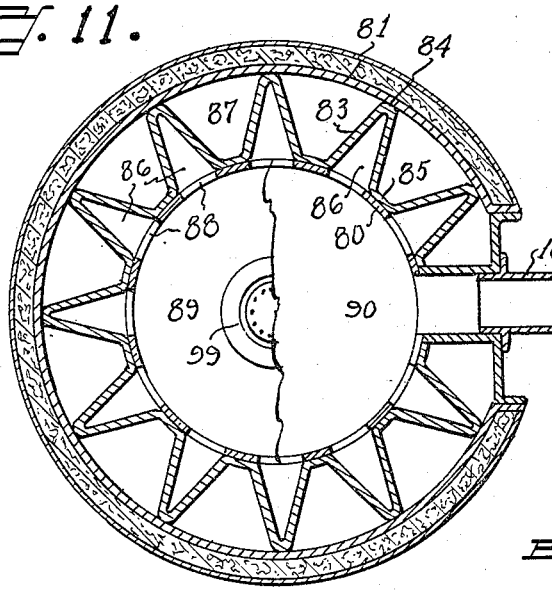
Fig. 11 is a section taken along the line 11—11 in Fig. 9.

Referring in detail to the form of the device shown in Figs. 9 to 12, inclusive, the cylindrical fire box 80 extends almost the full height of the furnace. The box 80 is enclosed within the shell 81 and the top 82 extends across the fire box 80 to the shell 81. The members 80 and 81 are separated by the saw-toothed spacer 83 whose outermost points 84 touch the shell 81 and whose innermost edges 85 touch the fire box 80 forming the gas conducting channels 86 and the air conducting channels 87. Gas outlet ports 88 are formed in the top of the fire box 80 and communicate directly with the channels 86.

The fire box 80 is provided with a bottom 89 which is spaced somewhat from the bottom 90 of the shell 81 which in turn is spaced from the floor line 91 of the furnace providing an air space 92 underneath the bottom 90 through which air is drawn from the cold air duct 93 and discharged upwardly through the air channels 87 thereby effectively carrying away the major portion of the heat absorbed by the spacer 83.

In this form of the device a fire inspection opening 94 is provided by passing the shell 95 through the members 80 and 81 and the opening 94 is normally closed by means of a door 96. A burner opening 97 is also provided by passing the shell 98 through the members 80 and 81 through which opening the burner 99 is placed. In this case the burned gases are drawn off from underneath the floor 89 through the smoke pipe 100.

Referring in detail to the form of the device shown in Figs. 13 to 16, there is shown a cylindrical fire box 101 which is disposed within the shell 102 and spaced therefrom. The bottom 103 of the fire box 101 is spaced from the bottom 104 of the shell 102. The top 105 extends across the members 101 and 102 which are spaced from each other by means of the saw-toothed spacer 106 whose outermost points 107 touch the shell 102 and whose edges 108 touch the fire box 101 forming the gas conducting channels 109 and the air conducting channels 110.

In this form of the device a false top 111 is placed across a portion of the fire box 101 near the bottom edge of the ports 112 which extend to the top 105 and communicate directly with the channels 109. A vertical wall 113 connects the false top 111 with the top 105. A smoke outlet pipe 114 communicates with the space between the members 105 and 111. The usual fire inspection opening 115 and burner inlet opening 116 for the burner 117 are also indicated.

In this form of the device gases from the burner 117 are burned within the fire box 101 and pass through the ports 112 downwardly under the floor 103 and then upwardly through the ports 118 into the space above the false top 111 and thence into the smoke pipe 114.

In the form of the device shown in Figs. 17 to 20 there is shown a cylindrical fire box 120 which is disposed within the cylindrical shell 121 which is spaced therefrom by a saw-toothed spacer 122 whose outermost points 123 engage the shell 121 and whose innermost edges 124 engage the outer surface of the fire box 120.

This construction divides the space between the fire box 120 and the shell 121 into gas flues 125 and air flues 126. Ports 127 in the lower portion of the fire box 120 communicate with the flues 125 which terminate in the circular manifold 128 which is formed around the inside of the fire box 120. At the top thereof a smoke pipe 129 carries the gaseous products of combustion from the annular manifold 128 to a stack (not shown).

The lower end of each flue 125 is closed by a bottom end plate 130. Across the lower end of the fire box 120 is placed a floor plate 131. A crown plate 132 is placed across the top of the fire box 120 along the upper edge of the annular manifold 128. The air flues 126 are open at their upper and lower ends in order to permit a free upward passage of warm air from the space 133 through the flues 126 into the warm air ducts of the heating system.

In furnaces of this type it is desirable to have the lower end 134 of the smoke pipe 129 open below the lowermost line of the annular manifold 128 in order to provide proper scavenging of gases from the stack of the pipe 129.

In this form of the device, a casing 135 is placed around the furnace which rests upon the base 136. The shells 120 and 121 are connected by the wall 137 to form a large opening into the combustion chamber 138. This opening is covered by a plate 139 on which is formed a fire door opening 140 around which is placed a flanged frame 141 upon which is hinged a fire door 142.

A burner 143 projects through the plate 139 into the combustion chamber 138.

It can be seen that by this construction the burning gases are made to circulate through the entire interior of the combustion chamber 138 after which they pass through the opening 127 and upwardly through the gas flues 125 and thence into the annular manifold 128 and then into the pipe 129.

This type of furnace is similar to the forms previously described but is superior thereto inasmuch as it does not permit the forming of any dead pockets and the transfer of the heat from the fuel to the furnace is very uniformly distributed; limiting thereby any tendency to form hot spots in any portion of the furnace, which of course, would be detrimental to the life thereof.

It will be noted that in the five forms of the device there are several common characteristics. First, the gas conducting channels are vertical and are open at the ends and devoid of bends. Second, owing to the nature and relationship of the air and gas passageways, there is a vigorous scouring action by the air and gas which tends to effectively transfer the desired amount of heat from the gas to the air passing through the furnace and that only a minimum amount of heat reaches the outer shell which is further insulated to prevent the escape of heat therefrom into the surrounding atmosphere instead of being delivered to the warm air ducts of the system.

I claim:

1. A furnace of the class described consisting of a cylindrical fire box, a plurality of vertical gas flues disposed around said fire box and having out-turned median ridges, the outer walls of the flues being vertical members, having a V-shape in cross-section, the fire box wall constituting the inner sides of the flues, the wall of said fire box having openings connecting with the lower ends of said gas flues, a manifold connected with the upper ends of said gas flues and having open stack connections, a case surrounding said fire box and gas flues spaced therefrom to form an air-warming compartment, and a burner in said fire box disposed below the lower ends of the openings communicating between said fire box and gas flues.

2. A furnace including a vertical cylindrical fire box having a series of openings therethru at one level and a second series of openings at a different level, both series being appreciably above the level of the bottom of the fire box, a cylindrical case coaxial with the fire box and of larger diameter to provide an annular space between the fire box and the case, a spacer within said space consisting of an irregular corrugated partition wall, the horizontal cross-section of which is a plurality of capital M's each symmetrical with respect to a radial line thru the common axis of the fire box and the case, thus providing a plurality of flues V-shaped in cross-section with their median ridges alternately inwardly toward the fire box and outwardly toward the case, and means closing the bottom ends of the flues which have their median ridges toward the case, leaving the alternate flues open at top and bottom for passage of air directly thru, said closed end flues being positioned so as to be in communication with an opening of each of the two series, whereby the gases pass thru one series of openings into the closed end flues of the spacer and after passing vertically in said flues pass out thru the openings of the other of the two series of openings and in such passing heat the air passing in the alternate flues.

3. The device of claim 2 in which the alternate flues which conduct air are larger in cross-sectional area than the gas flues between them and the walls of the air ducts have an angle at their median ridge of roughly 60°.

4. The device of claim 2 in which there is an annular manifold within the fire box at its top in communication with the upper ends of the gas flues, and a passage leading from the manifold to discharge the gases.

MAX C. RICHARDSON.